(12) United States Patent
Toda

(10) Patent No.: US 10,440,292 B2
(45) Date of Patent: Oct. 8, 2019

(54) COLOR SIGNAL AND NEAR-INFRARED SIGNAL GENERATED BY USING PATTERN INFORMATION DEFINING INTENSITY-CORRESPONDING PATTERN

(71) Applicant: NEC Corporation, Minato-ku, Tokyo (JP)

(72) Inventor: Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/757,456

(22) PCT Filed: Sep. 14, 2016

(86) PCT No.: PCT/JP2016/004195
§ 371 (c)(1),
(2) Date: Mar. 5, 2018

(87) PCT Pub. No.: WO2017/047080
PCT Pub. Date: Mar. 23, 2017

(65) Prior Publication Data
US 2018/0249096 A1    Aug. 30, 2018

(30) Foreign Application Priority Data
Sep. 18, 2015    (JP) .................. 2015-184885

(51) Int. Cl.
*H04N 5/33*    (2006.01)
*G02B 5/20*    (2006.01)
(Continued)

(52) U.S. Cl.
CPC ............. *H04N 5/332* (2013.01); *G02B 5/208* (2013.01); *H04N 5/2258* (2013.01);
(Continued)

(58) Field of Classification Search
CPC .... G02B 5/208; H04N 5/2254; H04N 5/2258; H04N 5/332; H04N 9/07; H04N 9/09; H04N 9/097
See application file for complete search history.

(56) References Cited

U.S. PATENT DOCUMENTS

2001/0016053 A1*    8/2001    Dickson ............... G01J 3/2803
                                                                    382/110
2009/0200469 A1*    8/2009    Morin ............... H01L 27/14621
                                                                    250/338.1
(Continued)

FOREIGN PATENT DOCUMENTS

JP    2007-235760 A    9/2007
JP    2011-243862 A    12/2011
(Continued)

OTHER PUBLICATIONS

International Search Report for PCT Application No. PCT/JP2016/004195, dated Nov. 8, 2016.
(Continued)

*Primary Examiner* — Jessica M Prince

(57) ABSTRACT

The invention enables image processing of visible light and near-infrared light using an imaging device. An acquisition unit (110) acquires an image signal representing an image including near-infrared light that has an intensity according to a pattern having a prescribed geometric shape. A signal processing unit (120) uses pattern information which defines the pattern to output, a color signal representing visible light components corresponding to the image signal and a near-infrared signal representing near-infrared light components corresponding to the image signal.

6 Claims, 15 Drawing Sheets

(51) Int. Cl.
  *H04N 5/225*  (2006.01)
  *H04N 9/097*  (2006.01)
  *H04N 9/04*  (2006.01)

(52) U.S. Cl.
  CPC ........... *H04N 9/045* (2013.01); *H04N 9/0451* (2018.08); *H04N 9/04553* (2018.08); *H04N 9/097* (2013.01); *H04N 5/2254* (2013.01)

(56) References Cited

U.S. PATENT DOCUMENTS

| | | | |
|---|---|---|---|
| 2013/0093929 A1* | 4/2013 | Kouyama | H04N 9/735 |
| | | | 348/273 |
| 2013/0329101 A1* | 12/2013 | Choi | H04N 9/045 |
| | | | 348/273 |
| 2014/0218538 A1* | 8/2014 | Choi | H04N 5/332 |
| | | | 348/164 |
| 2016/0255286 A1* | 9/2016 | Tsukada | H04N 5/332 |
| | | | 348/162 |

FOREIGN PATENT DOCUMENTS

| | | |
|---|---|---|
| JP | 2012-080553 A | 4/2012 |
| WO | 2015/133130 A1 | 9/2015 |

OTHER PUBLICATIONS

English translation of Written opinion for PCT Application No. PCT/JP2016/004195.

* cited by examiner

NIR CUT FILTER

IMAGE SENSOR

COLOR SIGNAL AND NEAR-INFRARED SIGNAL GENERATED BY USING PATTERN INFORMATION DEFINING INTENSITY-CORRESPONDING PATTERN

This application is a National Stage Entry of PCT/JP2016/004195 filed on Sep. 14, 2016, which claims priority from Japanese Patent Application 2015-184885 filed on Sep. 18, 2015, the contents of all of which are incorporated herein by reference, in their entirety.

TECHNICAL FIELD

The present invention relates to video processing.

BACKGROUND ART

Color image input devices, such as a digital still camera and a video camera, generally have a configuration in which an optical filter of three colors of red (R), green (G), and blue (B) is incorporated in an image sensor. Light incident on such a color image input device is decomposed by the three-color optical filter and converted into signals corresponding to R, G, and B colors, respectively, by the image sensor.

When a silicon-based sensor is used as the image sensor used for the color image input device, sensitivity of the sensor ranges from a visible range to a near-infrared range. However, a near-infrared light component may have an adverse effect on color reproduction. However, the three-color optical filter guarantees a constant transmittance for a wavelength range corresponding to each color, but does not necessarily guarantee an optical transmission characteristic for ranges other than the visible range, such as the near-infrared range.

FIG. 17 is a diagram exemplifying a spectral transmittance of an RGB three-color optical filter. For example, when the visible range is set from 400 to 700 nm, it is expected that the filters for the respective colors have characteristics for transmitting light having a wavelength in the vicinity of 400 to 500 nm (B), 500 to 600 nm (G), and 600 to 700 nm (R). However, the filters for the respective colors may also have characteristics for transmitting light in a range other than the visible range as illustrated in FIG. 17.

Spectral sensitivity characteristics of an image sensor using a photodiode that is often adopted in an image input device include sensitivity in a wavelength range of 700 nm or more. In this case, when only applying a three-color optical filter having spectral sensitivity characteristics as illustrated in FIG. 17 to a typical image sensor, this may cause a problem in terms of color reproducibility. Accordingly, when the image sensor is required to have high color reproducibility, the image sensor is provided with an infra-red cut filter.

FIG. 18 is a diagram illustrating color-matching functions of an XYZ colorimetric system associated with human color perception. As illustrated in FIG. 18, the human color perception does not include sensitivity for light in a wavelength of 700 nm or more. Accordingly, light having power in a wavelength range of 700 nm or more does not affect a perceived color that is a psychophysical value.

Herein, a case is assumed where light having power in a wavelength range of 600 nm or more as illustrated in FIG. 19 is observed. This light is perceived as red by a human. On the other hand, when the light is observed by an image sensor using a three-color optical filter as illustrated in FIG. 17, the output signal includes not only an R value, but also G and B values. Accordingly, the output signal represents a color different from the color (red) perceived by a human.

In the color image input device, an infrared cut filter having a spectral transmittance for removing an effect of near-infrared light in a wavelength of 700 nm or more as illustrated in FIG. 20 is used in order to implement color reproducibility according to the human color perception. Specifically, as illustrated in FIG. 21, the optical system of the color image input device is provided with an infrared cut filter 610 to thereby block incidence of near-infrared light on a three-color optical filter 620 and an image sensor 630. This configuration allows light having no power in the near-infrared range to be incident on the three-color optical filter 620 and the image sensor 630.

On the other hand, in a case of capturing a video under a circumstance in which an amount of light is insufficient, high-sensitivity capturing in which noise is suppressed is required. In such a case, it is desirable to increase an amount of received light in the image sensor in order that sensor noise due to an insufficient amount of light is suppressed. As a method for implementing high-sensitivity capturing in a dark place, a capturing method using near-infrared light is known.

A simplest method using near-infrared light during high-sensitivity capturing is a method in which an infrared cut filter set in an optical system is mechanically moved during high-sensitivity capturing to thereby temporarily remove the infrared cut filter from the optical system. However, this method has problems of an increase in the number of components, i.e., an increase in cost, as well as an increase in possibility of occurrence of a failure due to requirement for a mechanical operation for moving the infrared cut filter.

On the other hand, NPL 1 discloses a method for capturing without requiring any mechanical operation. Specifically, NPL 1 describes a capturing method using two cameras for capturing a color image and a near-infrared image, respectively.

Further, NPL 2 discloses, as illustrated in FIG. 22, an image sensor 700 having a configuration in which a four-color optical filter obtained by adding an infrared (IR) filter for transmitting near-infrared light to an RGB three-color optical filter is incorporated. FIG. 2 of NPL 2 illustrates spectral sensitivity characteristics of respective optical filters for R, G, B, and IR. The spectral sensitivity characteristics of respective optical filters for R, G, and B include spectral sensitivity similar to that of the IR filter in a near-infrared range. In order to implement high color reproducibility during capturing in the daytime, it is necessary to suppress or eliminate an effect of near-infrared light included in R, G, and B color signals. The image sensor described in NPL 2 removes IR components included in the R, G, and B color signals during capturing in the daytime, and uses not only an IR signal obtained by causing light to transmit an IR filter, but also IR components included in the R, G, and B color signals during capturing at night, thereby obtaining a black-and-white image.

PTL 1 discloses an imaging device that generates signals of R, G, B, and near-infrared (NIR) colors by using an R, G, and B three-color optical filter for transmitting NIR light, and a photosensor for detecting near-infrared light. This photo sensor includes a visible light sensor unit at a shallow position in a light incident direction, and also includes a non-visible light sensor unit at a deep position in the direction.

In addition, NPL 3 discloses a method for generating a four-channel image by separating a color channel and an NIR channel from an image captured by using a color filter array different from a typical one, by using two types of filters having different spectral transmission characteristics for G filters of an RGB Bayer type color filter array (CFA), without using an IR cut filter, and the like.

CITATION LIST

Patent Literature

[PTL 1] Japanese Unexamined Patent Application Publication No. 2011-243862

Non Patent Literature

[NPL 1] Sosuke Matsui, Mihoko Shimano, Takahiro Okabe, Yoichi Sato, "Image Enhancement of Low-Light Scenes with Combination of Color Image and Near Infrared Images", The 12th Meeting on Image Recognition and Understanding (MIRU 2009), collection of papers, pp. 1089-1096, 2009
[NPL 2] Shinzo Kayama, Keisuke Tanaka, Yutaka Hirose, "Day-and-night imager for security monitoring cameras", Panasonic Technical Journal, Vol. 54, No. 4, pp. 18-23, January, 2009
[NPL 3] Z. Sadeghipoor et al, "A Novel Compressive Sensing Approach to Simultaneously Acquire Color and Near-Infrared Images on a Single Sensor", Proc. of IEEE ICASSP, pp. 1646-1650, 2013.
[NPL 4] O. Losson, L. Macaire, Y. Yang, "Comparison of Color Demosaicing Methods", Advances in Imaging and Electron Physics, Vol. 162, pp. 173-265, 2010.
[NPL 5] R. Ramanath, W. Snyder, G. Bilbro, W. Sander, "Demosaicking methods for Bayer color array", J. Electronic Imaging, Vol. 11, No. 3, pp. 306-315, 2002.
[NPL 6] S. Ferradans, M. Bertalmio, V. Caselles, "Geometry-Based Demosaicking", IEEE Trans. on Image Processing, Vol. 18, No. 3, pp. 665-670, 2009.

SUMMARY OF INVENTION

Technical Problem

The method described in NPL 1 is to generate an RGB image and a near-infrared image by using two cameras. Although the method described in NPL 1 can be configured using one device, the method requires two optical paths and two image sensors for the RGB image and the near-infrared image, respectively.

The image sensors described in NPL 2 and PTL 1 are special image sensors for generating near-infrared images, and thus it can be said that the image sensors do not have a typical configuration. The color filter array described in NPL 3 requires two different G filters.

An object of the present invention is to provide a technique that enables video processing of visible light and near-infrared light by using a capturing device having a typical configuration.

Solution to Problem

An aspect of the invention is an image processing device. The image processing device includes an acquisition means configured to acquire a video signal representing a video including near-infrared light having an intensity corresponding to a pattern having a prescribed geometric shape. And the image processing device includes a signal processing means configured to output a color signal and a near-infrared signal by using pattern information for defining the pattern. The color signal represents a visible light component corresponding to the acquired video signal. The near-infrared signal represents a near-infrared light component corresponding to the video signal.

Another aspect of the invention is an imaging device. The imaging device includes a light receiving means including an optical filter configured to transmit near-infrared light with a pattern having a prescribed geometric shape, and being configured to generate a video signal representing a video including near-infrared light transmitted through the optical filter. The imaging device includes an image processing means configured to output a color signal and a near-infrared signal by using pattern information for defining the pattern. The color signal represents a visible light component corresponding to the generated video signal. The near-infrared signal represents a near-infrared light component corresponding to the video signal.

Another aspect of the invention is an image processing method. The image processing method includes acquiring a video signal representing a video including near-infrared light having an intensity corresponding to a pattern having a prescribed geometric shape; and outputting, by using pattern information for defining the pattern, a color signal representing a visible light component corresponding to the acquired video signal and a near-infrared signal representing a near-infrared light component corresponding to the video signal.

Another aspect of the invention is a computer-readable program recording medium recording a program. The program causes a computer to execute processing of acquiring a video signal representing a video including near-infrared light having an intensity corresponding to a pattern having a prescribed geometric shape. And the program causes a computer to execute processing of outputting, by using pattern information for defining the pattern, a color signal representing a visible light component corresponding to the acquired video signal and a near-infrared signal representing a near-infrared light component corresponding to the video signal.

Advantageous Effects of Invention

According to the present invention, it is possible to perform video processing of visible light and near-infrared light using a capturing device having a typical configuration.

DESCRIPTION OF EMBODIMENTS

First Example Embodiment

Figure 1:
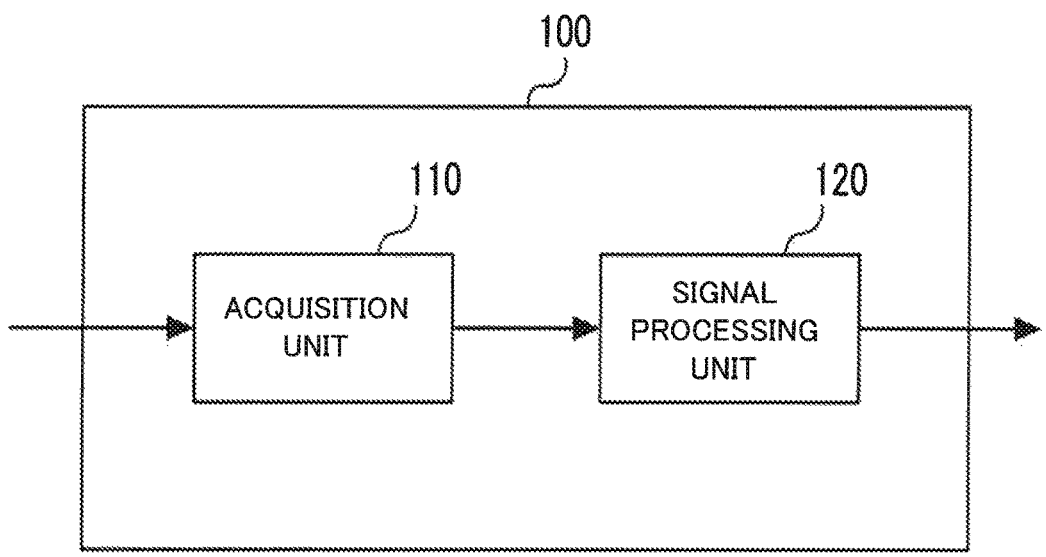
FIG. 1 is a block diagram illustrating a configuration of a video processing device.

FIG. 1 is a block diagram illustrating a configuration of a video processing device according to an example embodiment of the present invention. A video processing device 100 is a device that acquires a video signal representing a video including near-infrared light, and outputs a color signal and a near-infrared signal corresponding to the acquired video signal. In other words, the video processing device 100 is a device that separates the color signal and the near-infrared signal from the video imaged in a state where the video includes visible light and near-infrared light. Each arrow indicated in the subsequent block diagrams represent an example of a flow of a signal, but it is not intended that the flow of the signal is limited in a specific direction.

The term "video" described herein refers to an image to be captured through an optical system, such as a lens, and may be either a still image or a moving image. The color signal is a signal representing visible light components in the video signal. On the other hand, the near-infrared signal is a signal representing near-infrared light components in the video signal. The color signal and the near-infrared signal represent, for example, the brightness of a pixel, but are not limited only to the brightness. In the following description, it is assumed that the color signal and the near-infrared signal represent brightness of each pixel of a still image or an image of a video at a specific time of the video.

In this example embodiment, the term "visible range" refers to a wavelength range of 400 to 700 nm. In the wavelength range, a blue (B) wavelength range is from 400 to 500 nm, a green (G) wavelength range is from 500 to 600 nm, and a red (R) wavelength range is from 600 to 700 nm. The term "near-infrared range" refers to a wavelength range of 700 nm to 2.5 μm. However, classification of the wavelength ranges indicated herein is merely an example.

The video processing device 100 includes an acquisition unit 110 and a signal processing unit 120. The video processing device 100 is connected to an external device that supplies a video signal. The external device is, for example, an imaging device including an image sensor. The acquisition unit 110 acquires a video signal from the external device. The signal processing unit 120 outputs a color signal and a near-infrared signal based on the video signal acquired by the acquisition unit 110.

The acquisition unit 110 acquires a video signal representing a video including near-infrared light having an intensity corresponding to a pattern having a prescribed geometric shape. The term "pattern" described herein refers to a pattern in which figures, such as a circle or a rectangle, are repeatedly regularly arranged. Such a video signal is obtained in such a manner that, for example, the image sensor is provided with an optical filter (hereinafter referred to as an "NIR cut tilter") that cuts near-infrared light.

Figure 2:
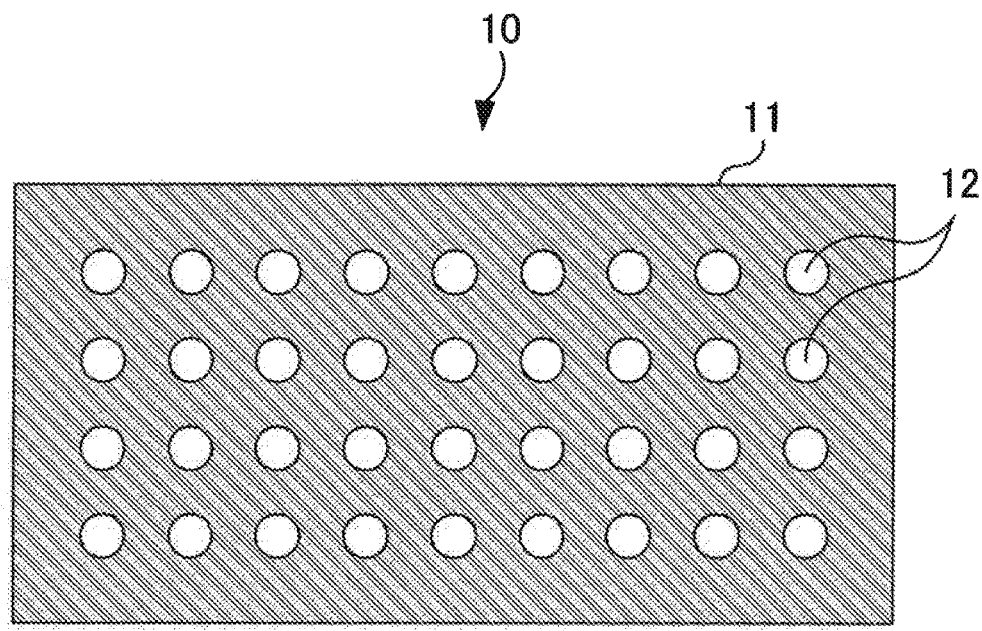
FIG. 2 is a diagram illustrating an NIR cut filter.

FIG. 2 is a diagram illustrating an NIR cut filter vertically with respect to a light incident direction. An NIR cut filter 10 illustrated in FIG. 2 has a configuration in which the filter unit 11 is provided with a plurality of infrared transmissive portions 12. In this case, the infrared transmissive portions 12 are circular holes arranged at regular intervals. In the NIR cut filter 10, each infrared transmissive portion 12 transmits near-infrared light, without blocking the near-infrared light, and the filter unit 11 cuts a prescribed ratio or more of the near-infrared light.

The pattern in which near-infrared light components included in the video signal are formed on the video does not necessarily match the pattern of the NIR cut filter. This is because the near-infrared light causes diffraction after the near-infrared light is transmitted through the NIR cut filter. Each figure in the pattern of the near-infrared light components appearing as a video in the video signal is larger than the pattern (corresponding to the infrared transmissive portion 12 illustrated in FIG. 2) formed in the NIR cut filter.

The signal processing unit 120 acquires such a video signal from the acquisition unit 110, and outputs a color signal and a near-infrared signal. The color signal is typically output as signals of three components of R, G, and B, but is not necessarily limited to this form. The signal processing unit 120 executes prescribed arithmetic processing by using pattern information for defining a pattern of the near-infrared light, thereby enabling the color signal and the near-infrared signal to be output.

The pattern information is information for specifying a pattern of the near-infrared light on the video. For example, the pattern information is data representing a position and shape of the pattern in an NIR cut filter. In the case of the NIR cut filter illustrated in FIG. 2, the pattern information may be data in which the coordinates of the center of a circle of each infrared transmissive portion 12 and the radius thereof are described as parameters, but instead any data may be used as long as the pattern can be specified. The pattern information may be preliminarily stored in the video processing device 100, or may be input by a user or the like. For example, the pattern information may be preliminarily obtained in such a manner that a user carries out a calibration.

As described above, the video processing device 100 can separate the color signal and the near-infrared signal from the video signal by using a combination of the video signal representing the video including near-infrared light with a prescribed pattern and the pattern information. Therefore, according to the video processing device 100, it is possible to respectively execute visible light video processing and near-infrared light video processing based on the video signal including the color signal and the near-infrared signal.

Further, when the video signal is obtained by an imaging device, it is sufficient to use a typical imaging device provided with the NIR cut filter as illustrated in FIG. 2, and thus a typical configuration can be used. In this example embodiment, the use of the output near-infrared signal is not particularly limited.

Second Example Embodiment

Figure 3:
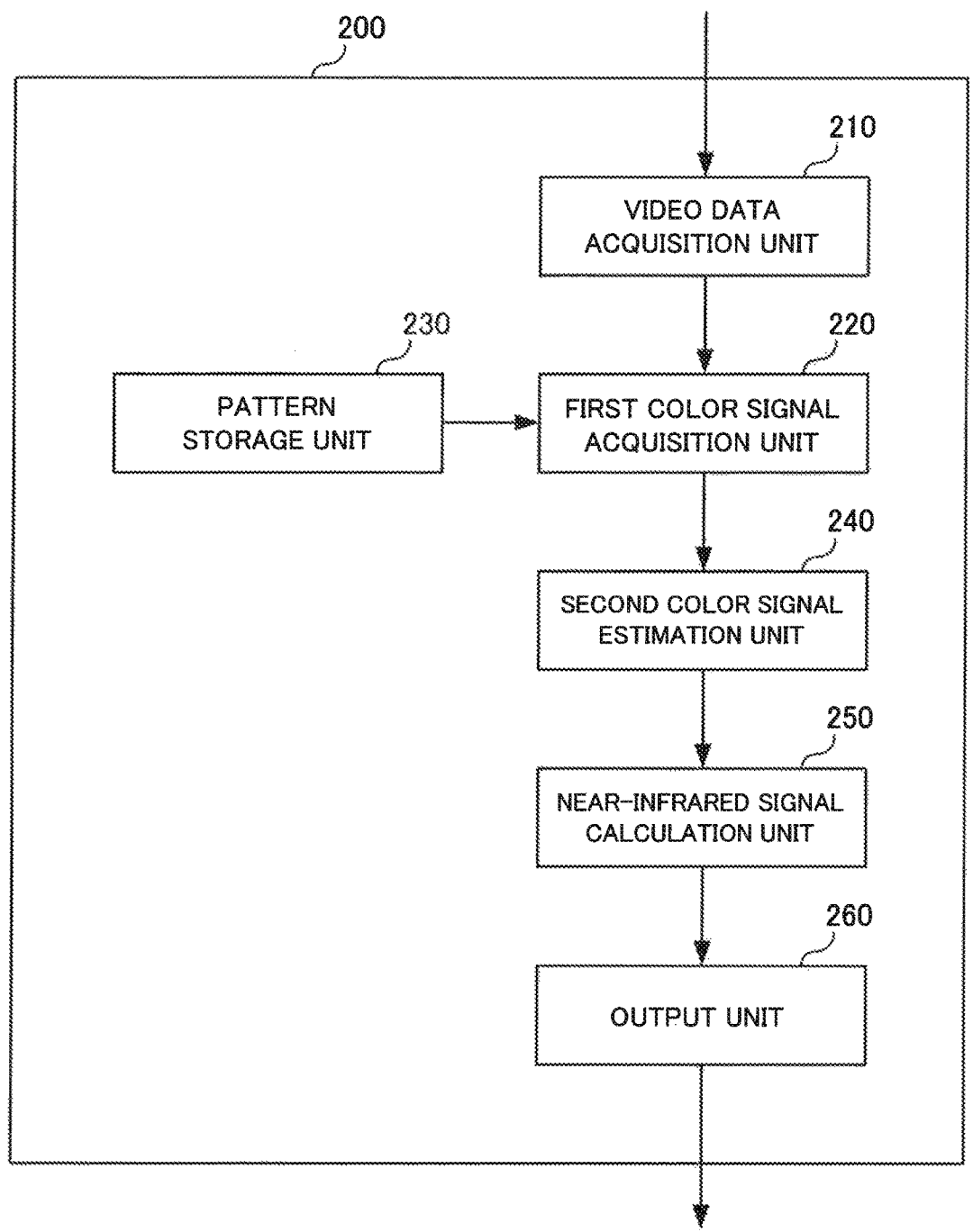
FIG. 3 is a block diagram illustrating a configuration of a video processing device.

FIG. 3 is a block diagram illustrating a configuration of a video processing device according to another example embodiment of the present invention. A video processing device 200 illustrated in FIG. 3 includes a video data acquisition unit 210, a first color signal acquisition unit 220, a pattern storage unit 230, a second color signal estimation unit 240, a near-infrared signal calculation unit 250, and an output unit 260. The video processing device 200 has functions similar to those of the video processing device 100 according to the first example embodiment.

The video data acquisition unit 210 acquires video data. The video data acquisition unit 210 can acquire video data from an external device similar to that of the first example embodiment. The video data includes at least a plurality of color signals. In this case, the plurality of color signals are color signals represented by separate color components of three colors of R, G, and B, and each pixel is represented by a value of a prescribed bit number. The term "color signals" described herein refers to a video in a state where near-infrared light components are superimposed on visible light components. Such color signals are hereinafter also referred to as a "first color signal". The first color signal is a signal obtained by adding a second color signal and a near-infrared signal which are described below.

The first color signal acquisition unit 220 acquires the first color signal from the video data acquisition unit 210. The first color signal acquisition unit 220 acquires the first color signal for each color.

The pattern storage unit 230 stores pattern information. The pattern storage unit 230 is composed of, for example, a storage medium such as a hard disk or a flash memory. As the pattern information of this example embodiment, data similar to that of the first example embodiment can be used. As the pattern information, data common to each color can be used.

The second color signal estimation unit 240 estimates the second color signal which is a color signal obtained by removing near-infrared light components from the first color signal. Further, the second color signal estimation unit 240 estimates not only the second color signal, but also the intensity ratio between the second color signal and the near-infrared signal. The second color signal estimation unit 240 estimates the second color signal for each color and the intensity ratio thereof based on the first color signal acquired by the first color signal acquisition unit 220 and the pattern information stored in the pattern storage unit 230.

The near-infrared signal calculation unit 250 calculates a near-infrared signal for each color. The near-infrared signal calculation unit 250 can calculate a near-infrared signal by using the second color signal estimated by the second color signal estimation unit 240 and the intensity ratio between the second color signal and the near-infrared signal.

The output unit 260 outputs a second color signal and a near-infrared signal. The output unit 260 executes a prescribed calculation (e.g., addition) on the near-infrared signal for each color calculated by the near-infrared signal calculation unit 250, and outputs calculation results.

The first color signal acquisition unit 220, the second color signal estimation unit 240, and the near-infrared signal calculation unit 250 may sequentially execute processing for each color, or may simultaneously execute the processing in parallel.

Figure 4:
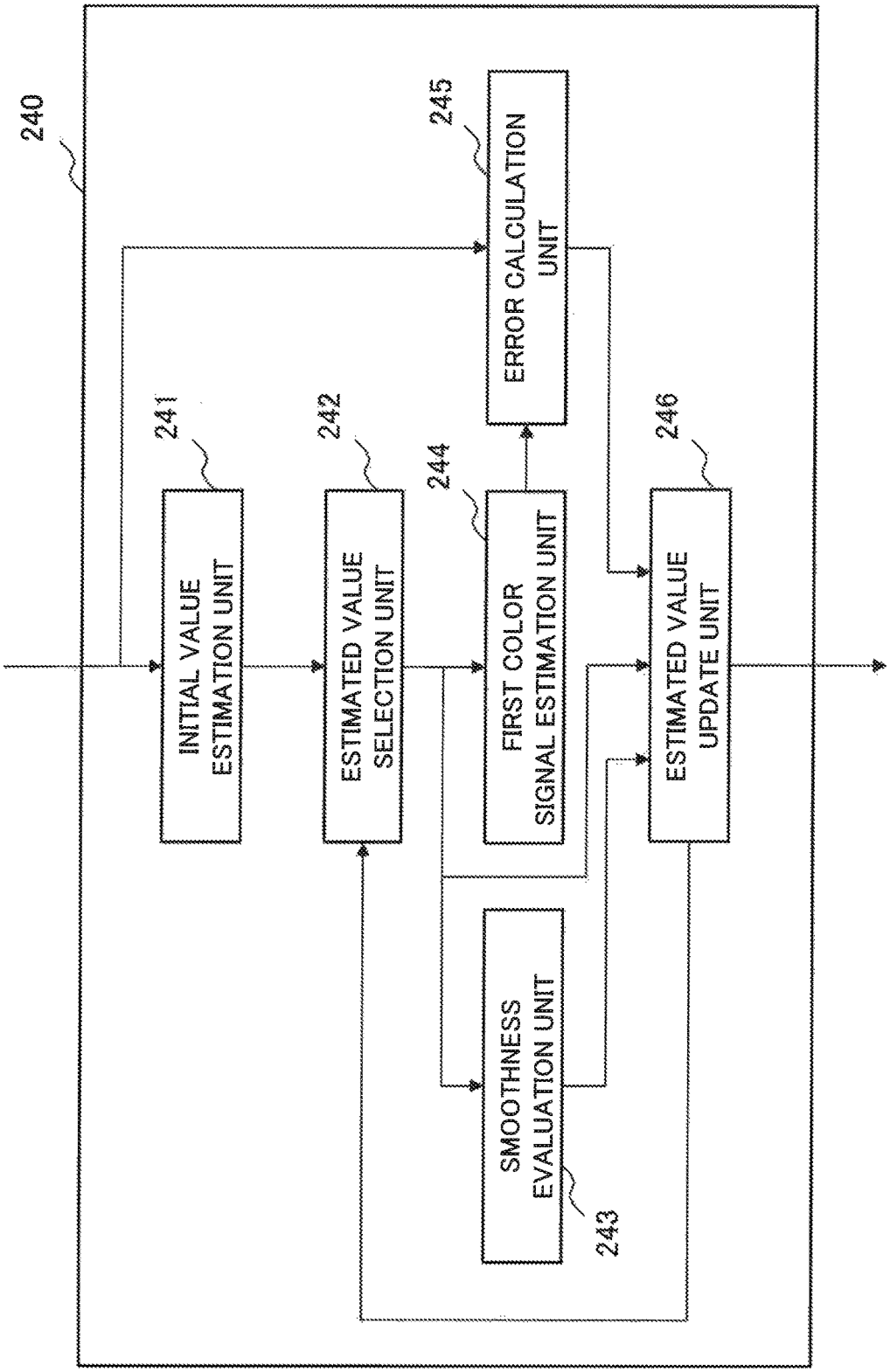
FIG. 4 is a block diagram illustrating a configuration of a second color signal estimation unit.

FIG. 4 is a block diagram illustrating the configuration of the second color signal estimation unit 240 in more detail. The second color signal estimation unit 240 includes an initial value estimation unit 241, an estimated value selection unit 242, a smoothness evaluation unit 243, a first color signal estimation unit 244, an error calculation unit 245, and an estimated value update unit 246.

The initial value estimation unit 241 calculates initial values of estimated values of the second color signal and the intensity ratio between the second color signal and the near-infrared signal. The initial value estimation unit 241 calculates initial values of the estimated value of the second color signal and the estimated value of the intensity ratio based on the first color signal.

The estimated value selection unit 242 selects the estimated values of the second color signal and the intensity ratio. The estimated value selection unit 242 repeatedly performs processing of selecting these estimated values. In the initial selection processing, the estimated value selection unit 242 selects the initial value calculated by the initial value estimation unit 241, while in the second and subsequent selection processing, the estimated value selection unit 242 selects an estimated value updated by the estimated value update unit 246.

The smoothness evaluation unit 243 evaluates smoothness of the estimated values of the second color signal and the intensity ratio. In this case, the smoothness indicates a degree of spatial variation in values. For example, the phrase "the estimated value of the second color signal is smooth" indicates that the difference between a maximum value and a minimum value of an estimated value of each pixel in a certain range constituting a video is equal to or less than a prescribed threshold. The smoothness evaluation unit 243 calculates an evaluated value of the smoothness according to a prescribed algorithm.

The first color signal estimation unit 244 estimates the first color signal. The first color signal estimation unit 244 calculates an estimated value of the first color signal based on the estimated value selected by the estimated value selection unit 242 and the pattern information stored in the pattern storage unit 230.

The error calculation unit 245 compares the estimated value of the first color signal with the actual first color signal, and calculates an error therebetween. Specifically, the error calculation unit 245 compares the first color signal estimated by the first color signal estimation unit 244 with the first color signal acquired by the first color signal acquisition unit 220.

The estimated value update unit 246 updates the estimated values of the second color signal and the intensity ratio. The estimated value update unit 246 updates the estimated values based on the estimated value calculated by the smoothness evaluation unit 243 and the error calculated by the error calculation unit 245.

Further, the estimated value update unit 246 compares the estimated values before and after the update. When the amount of update of each estimated value is sufficiently small, the update is finished. Specifically, the estimated value update unit 246 compares the amount of update of each estimated value with a prescribed threshold, and when the amount of update is equal to or less than the threshold, the estimated value update unit 246 finishes the update. The estimated value update unit 246 sets the estimated value obtained at the time when the update is finished as an output value of the second color signal estimation unit 240.

On the other hand, when the amount of update exceeds the threshold, the estimated value update unit 246 supplies the estimated value to the estimated value selection unit 242. In this case, the estimated value selection unit 242, the smoothness evaluation unit 243, the first color signal estimation unit 244, the error calculation unit 245, and the estimated value update unit 246 executes the above-described processing by using the updated estimated value, and repeatedly perform this processing until the update of the estimated value is finished.

The video processing device 200 has a configuration as described above. In this configuration, when the video processing device 200 acquires video data, the video processing device 200 outputs the color signal and the near-infrared signal. Specific operations of the video processing device 200 will be described below. It is assumed herein that color signals for R, G, and B colors are set to all pixels of video data.

Figure 5:
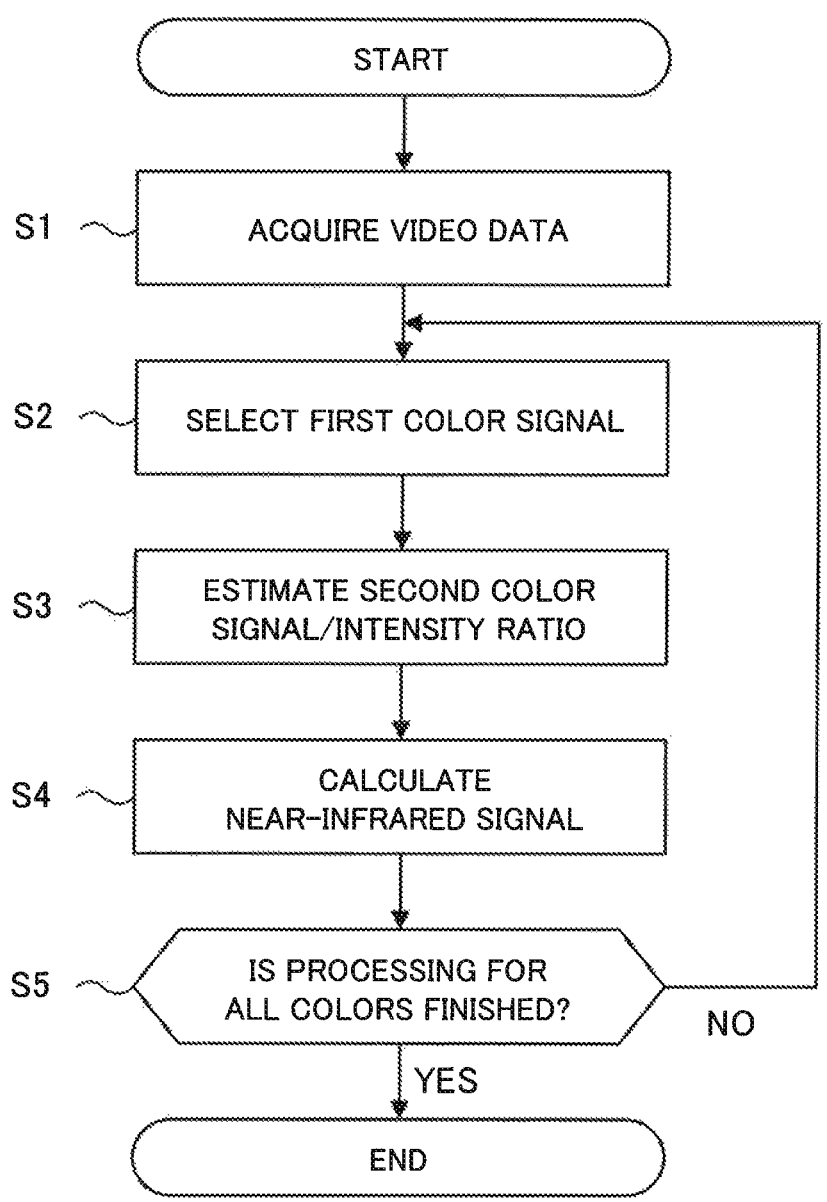
FIG. 5 is a flowchart schematically illustrating processing executed by the video processing device.

FIG. 5 is a flowchart schematically illustrating processing executed by the video processing device 200. However, the video processing device 200 need not necessarily execute the processing as illustrated in FIG. 5. For example, the video processing device 200 may execute processing of steps S3 and S4 in parallel on the color signals for R, G, and B colors.

First, the video data acquisition unit 210 acquires video data (step S1). Next, the first color signal acquisition unit 220 selects any one of a plurality of first color signals included in the video data acquired by the video data acquisition unit 210 (step S2). At this time, the first color signal acquisition unit 220 selects a first color signal on which the processing of steps S3 and S4, which are described below, has not been executed yet.

When any one of the first color signals is selected by the first color signal acquisition unit 220, the second color signal estimation unit 240 estimates a second color signal and an intensity ratio between the second color signal and a near-infrared signal based on the selected first color signal (step S3). In other words, the second color signal estimation unit 240 calculates an estimated value of the second color signal and an estimated value of the intensity ratio. Next, the near-infrared signal calculation unit 250 calculates a near-infrared signal based on these estimated values (step S4).

After obtaining the necessary second color signal and near-infrared signal, the output unit 260 outputs the second color signal and near-infrared signal. Specifically, the output unit 260 determines whether or not the processing of steps S2 to S4 has been executed for all colors (step S5). When the processing for all colors has been finished (step S5: YES), the second color signal and the near-infrared signal are output (step S6).

On the other hand, when there is any color for which the processing of steps S2 to S4 has not been executed (step S5: NO), the first color signal acquisition unit 220 selects a first color signal that has not been processed (step S2). The second color signal estimation unit 240 and the near-infrared signal calculation unit 250 executes the processing of steps S3 and S4 again according to the selection in step S2.

The processing of steps S3 and S4 will be described in more detail below. The following description is made by using a color of "G" for convenience of explanation, but processing for other colors is performed in a similar manner.

Figure 6:
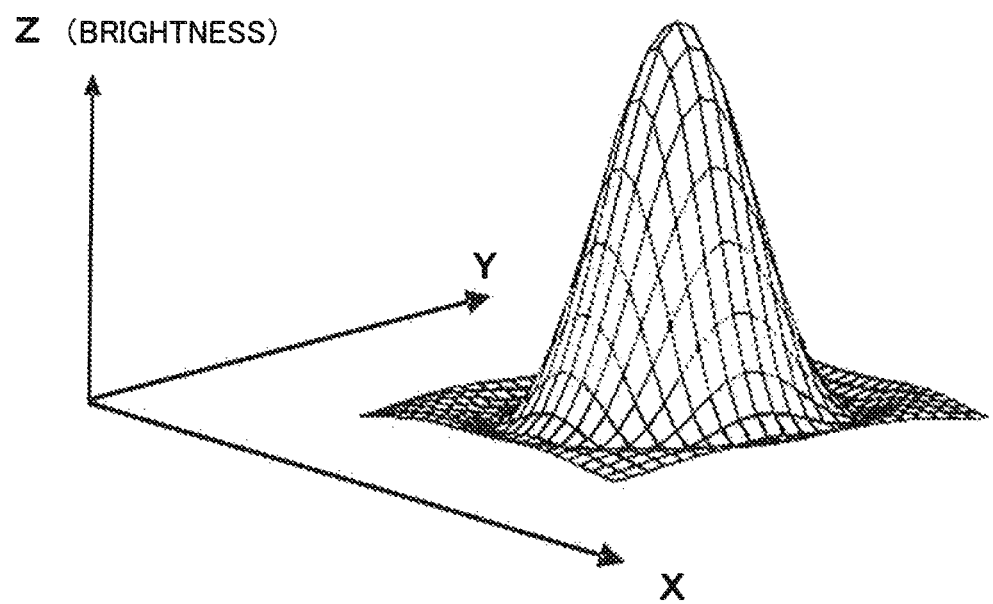
FIG. 6 is a diagram illustrating a near-infrared signal.

FIG. 6 is a diagram illustrating the near-infrared signal according to this example embodiment, and illustrates a near-infrared signal that is transmitted through a circular infrared transmissive portion provided in the NIR cut filter. In this case, an X-axis and a Y-axis respectively correspond to Cartesian coordinates defined in a video represented by video data. A Z-axis represents brightness of the near-infrared signal.

The near-infrared signal has a value significant to a range wider than the actual area of the infrared transmissive portion due to an effect of diffraction of near-infrared light, and the value gradually decreases toward the outside from the center of the infrared transmissive portion. When a distance between adjacent infrared transmissive portions is short, the near-infrared signal may contain a mixture of components derived from a certain infrared transmissive portion and components derived from another infrared transmissive portion.

Figure 7A:
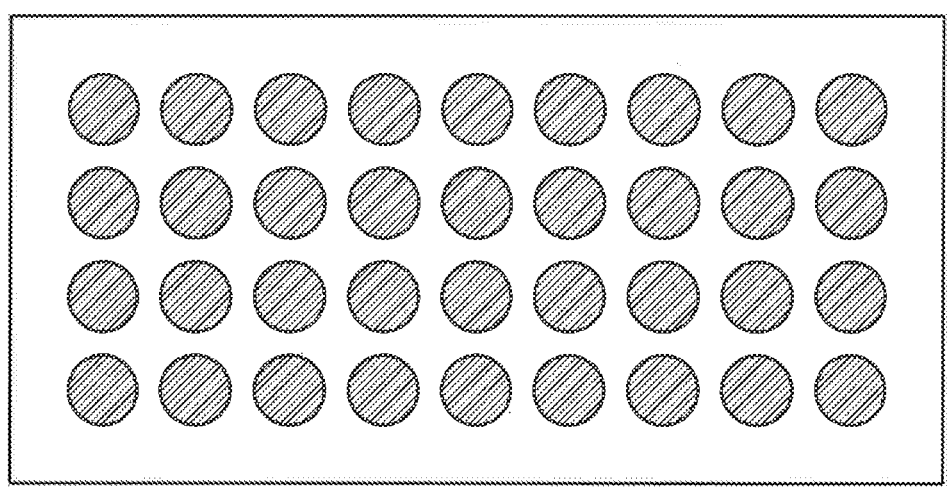
FIG. 7A is a diagram illustrating near-infrared light corresponding to a pattern of an NIR cut filter.
Figure 7B:
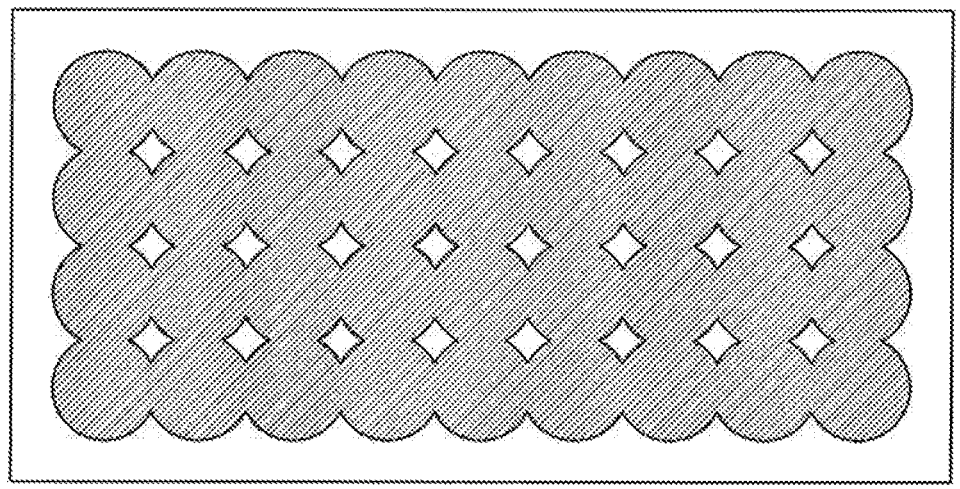
FIG. 7B is a diagram illustrating near-infrared light corresponding to a pattern of an NIR cut filter.

FIGS. 7A and 7B are diagrams each illustrating near-infrared light corresponding to the pattern of the NIR cut filter, and illustrate a range of near-infrared light irradiated on the image sensor. FIG. 7A illustrates a case where infrared light beams from the respective infrared transmissive portions do not overlap each other. On the other hand, FIG. 7B illustrates a case where infrared light beams from the respective infrared transmissive portions overlap each other.

Figure 8:
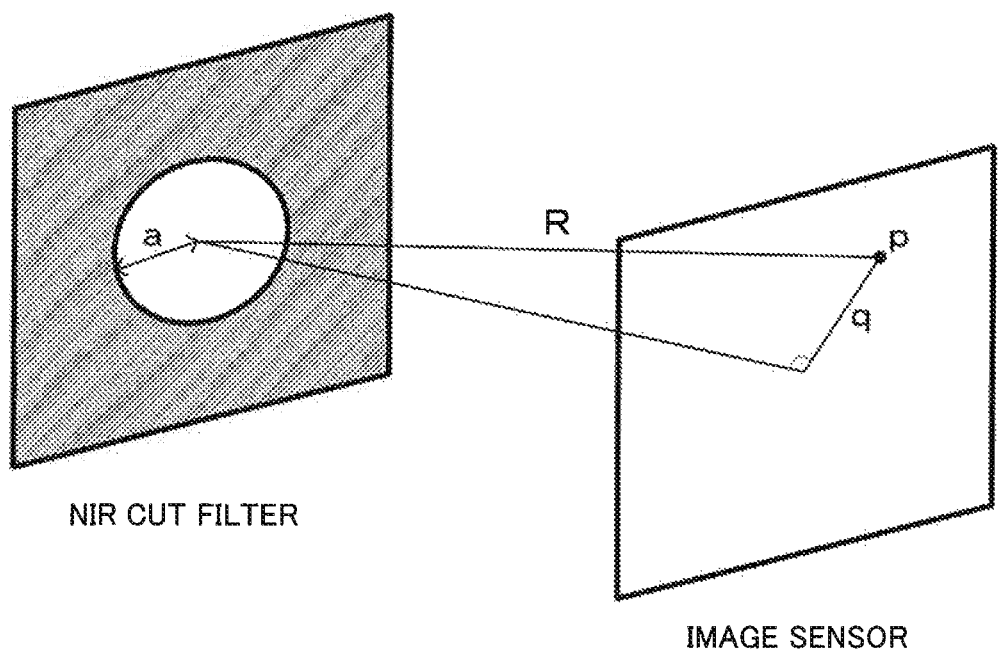
FIG. 8 is a diagram for explaining values in Formula (2).

In this case, an intensity I(w) on the image sensor when the near-infrared light having a wavelength λ and an incident intensity $I_0$ is incident into one infrared transmissive portion located on the NIR cut filter is represented by the following Formula (1).

$$I(w) = I_0 \left[ \frac{2J_1(w)}{w} \right]^{2C} \tag{1}$$

where $J_1(w)$ represents the Bessel function of the first kind of order 1, and C represents a prescribed correction coefficient. The correction coefficient C is a coefficient for adjusting the intensity I(w) to match the pattern formed in actual video. "w" is represented by the following Formula (2).

$$w = \frac{2\pi a}{\lambda} \frac{q}{R} \tag{2}$$

where "a" represents a radius of the infrared transmissive portion. "q" and "R" respectively correspond to a distance between a point "p" and a point where a perpendicular to the image sensor from the center of the infrared transmissive portion intersects with the image sensor, and a distance between the center of the infrared transmissive portion and the point "p", when any point on the image sensor is set as the point "p". FIG. 8 illustrates "a", "q", and "R" in Formula (2).

Figure 9:
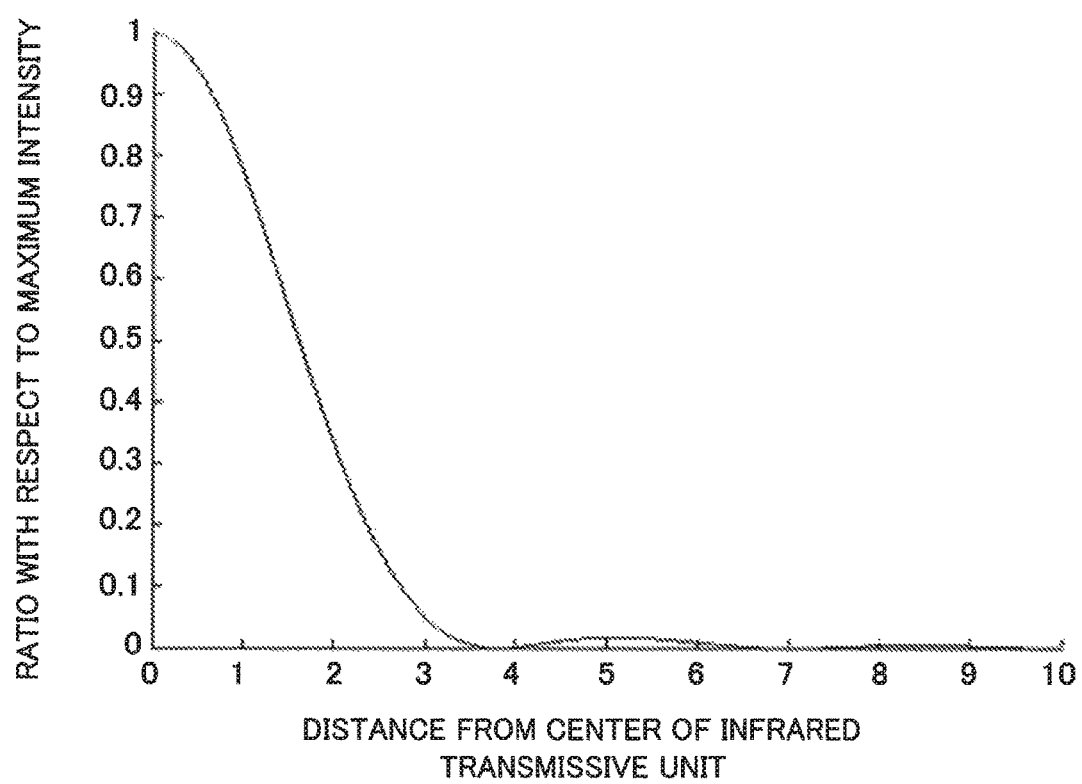
FIG. 9 is a diagram illustrating a relationship between an intensity of near-infrared light and a distance from the center.

FIG. 9 is a diagram illustrating a relationship between the distance from the center and the intensity of one pattern formed on the image sensor when near-infrared light is diffracted by the NIR cut filter. The correction coefficient C in Formula (1) is determined so that the intensity I(w) matches the pattern.

Accordingly, assuming that an intensity of the near-infrared signal at a position X on the image corresponding to the unit that transmits near-infrared light (i.e., the infrared transmissive portion) is represented by $I_{NIR\_G}(X)$, an intensity $I_{NIR\_G}(X,x)$ that is observed in a pixel located at a position x by the near-infrared light transmitted through the same infrared transmissive portion is represented by the following Formula (3).

$$I_{NIR\_G}(X,x) = k_{X \to x} I_{NIR\_G}(X) \quad (3)$$

where $k_{X \to x}$ represents a coefficient calculated by using Formulas (1) and (2) from a distance between the position X and the position x on the image sensor. However, the method for calculating the coefficient $k_{X \to x}$ is not limited to this method. As the method for calculating the coefficient $k_{X \to x}$, for example, when spectral distribution of the near-infrared signal $I_{NIR\_G}(X)$ is known, there is a method for combining coefficients calculated by using Formulas (1) and (2) at each wavelength based on the spectral distribution. The coefficient $k_{X \to x}$ can also be obtained by calculation based on the standard spectral distribution of near-infrared light in a capturing scene, or computation in advance using another means.

Further, light that reaches the pixel located at the position x is mixed light of visible light and near-infrared light. Specifically, the first color signal in the pixel located at the position x is obtained by adding the second color signal, which is the color signal composed only of visible light components, and a signal representing near-infrared light that reaches the pixel from a plurality of infrared transmissive portions constituting the pattern on the NIR cut filter. Accordingly, the first color signal can be represented by $I_{G\_NIR}(x)$ illustrated in Formula (4). In the formula, $I_G(x)$ corresponds to the second color signal representing a G component in the visible light components.

$$I_{G\_NIR}(x) = I_G(x) + \sum_{\forall X} k_{X \to x} I_{NIR\_G}(X) \quad (4)$$

where the relationship between the second color signal $I_G(X)$ and the near-infrared signal $I_{NIR\_G}(X)$ is represented by Formula (5) when using an intensity ratio $m_G$. Formula (4) can be transformed into Formula (6) by using Formula (5).

$$I_{NIR\_G}(X) = m_G(X) I_G(X) \quad (5)$$

$$I_{G\_NIR}(x) = I_G(x) + \sum_{\forall X} k_{X \to x} m_G(X) I_G(X) \quad (6)$$

The use of the model formula represented by Formula (6) enables estimation of the second color signal and the intensity ratio from the first color signal. Assuming that a vector including the first color signal ($I_{G\_NIR}(x)$) for each pixel as an element is represented by $I_{G\_NIR}$, $I_{G\_NIR}$ can be theoretically represented by Formula (7).

$$I_{G\_NIR} = I_G + KD(M_G) S I_G \quad (7)$$

where $I_G$ represents a vector including the second color signal ($I_G(x)$) for each pixel as an element; S represents a sampling matrix for extracting the second color signal in a portion that transmits the near-infrared light; $D(M_G)$ represents a diagonal matrix including, as a diagonal element, each element of a vector $M_G$ including the value of an intensity ratio ($m_G$) for each portion that transmits the near-infrared light as an element; and K represents a matrix including the value of the coefficient $k_{X \to x}$ as an element.

The second color signal $I_G$ and the intensity ratio $M_G$ are obtained by calculating a value for minimizing an energy function E represented by the following Formula (8).

$$E(I_G, M_G) = \frac{1}{2} \| I_{G\_NIR} - (I_G + KD(M_G) S I_G) \|^2 + \lambda_1 C_1(I_G) + \lambda_2 C_2(M_G) \quad (8)$$

The first term on the right side of Formula (8) represents a value larger than 0 unless the second color signal $I_G$ and the intensity ratio $M_G$ satisfy the relationship of Formula (7). The second and third terms on the right side of Formula (8) are regularization terms for preventing the energy minimization in the first term on the right side derived from Formula (7) from being ill-posed. These terms are terms obtained by multiplying coefficients $\lambda_1$ and $\lambda_2$ that are preliminarily set to cost functions $C_1(I_G)$ and $C_2(M_G)$ for evaluating spatial smoothness of the second color signal and the intensity ratio.

The cost functions for evaluating the smoothness are represented by, for example, C(p) in Formulas (9) and (10). In this case, $\Omega_p$ represents a set of pixels constituting the image sensor, and N(x) represents a function indicating a position of a spatially adjacent pixel group. Further, p(x) represents data (the second color signal $I_G$ or the intensity ratio $M_G$) corresponding to the pixel located at the position x on the image sensor, and p(y) represents data (the second color signal $I_G$ or the intensity ratio $M_G$) corresponding to any arbitrary pixel in a pixel group spatially adjacent to the pixel located at the position x.

$$C(p) = \sum_{x \in \Omega_p} \sum_{y \in N(x)} |p(x) - p(y)| \quad (9)$$

$$C(p) = \sum_{x \in \Omega_p} \sum_{y \in N(x)} \| p(x) - p(y) \|^2 \quad (10)$$

The second color signal $I_G$ and the intensity ratio $M_G$ are calculated in such a manner that, specifically, the second color signal estimation unit 240 updates the value by using a repeat operation. This repeat operation is a repeat operation in which $I^0_G$ is set as $I_G$ NIR and values of all elements of $M^0_G$ are set as a matrix of 1.0, and the update formulas as represented by Formulas (11) and (12) are repeated until the amount of update becomes sufficiently small.

$$I_G^{t+1} = I_G^t + k^t \left( (E + KD(M_G^t)S)^T (I_{G\_NIR} - (E + KD(M_G^t)S) I_G^t) - \lambda_1 \frac{\partial C_1(I_G^t)}{\partial I_G^t} \right) \quad (11)$$

$$M_G^{t+1} = M_G^t + k^t \left( (KD(SI_G^{t+1}))^T (I_{G\_NIR} - I_G^{t+1} - (KD(SI_G^{t+1})) M_G^t) - \lambda_2 \frac{\partial C_2(M_G^t)}{\partial M_G^t} \right) \quad (12)$$

where $V^t_G$ and $M^t_G$ respectively represent $I_G$ and $M_G$ at a repetition number t·$k^t$ represents a coefficient for adjusting the amount of updateat the repetition number t, and satisfies $0 < k^t < 1$; E represents a unit matrix; and superscript T represents the transposition of a matrix.

Thus, when the second color signal $I_G$ and the intensity ratio $M_G$ are calculated, the near-infrared signal $I_{NIR\_G}$ can be calculated. Specifically, when the near-infrared signal calculation unit 250 substitutes the second color signal $I_G$ and the intensity ratio $M_G$ into Formula (5), thereby calculating a near-infrared signal $I_{NIR\_G}$.

The second color signal and the near-infrared signal for R and B components can also be calculated in a manner similar to those for the G component. Specifically, by a calculation similar to that for the G component, the second color signal $I_R$ and the near-infrared signal $I_{NIR\_R}$ for the R component, and the second color signal $I_B$ and the near-infrared signal $I_{NIR\_B}$ for the B component can be calculated.

A near-infrared signal output from the video processing device 200 is obtained by adding the near-infrared signals corresponding to the R, G, and B components, respectively. Specifically, assuming that the output near-infrared signal is represented by $I_{NIR}$, $I_{NIR}$ is represented by the following Formula (13).

$$I_{NIR}=I_{NIR\_R}+I_{NIR\_G}+I_{NIR\_B} \quad (13)$$

The video processing device 200 executes such arithmetic processing, thereby outputs video data including the near-infrared signal $I_{NIR}$ and second color signals $I_R$, $I_G$, and $I_B$. The video processing device 200 can obtain the second color signal and the near-infrared signal from the first color signal only by preparing an NIR cut filter and pattern information corresponding to the NIR cut filter. In this case, the imaging device does not require any special configuration other than the NIR cut filter.

Third Example Embodiment

Figure 10:
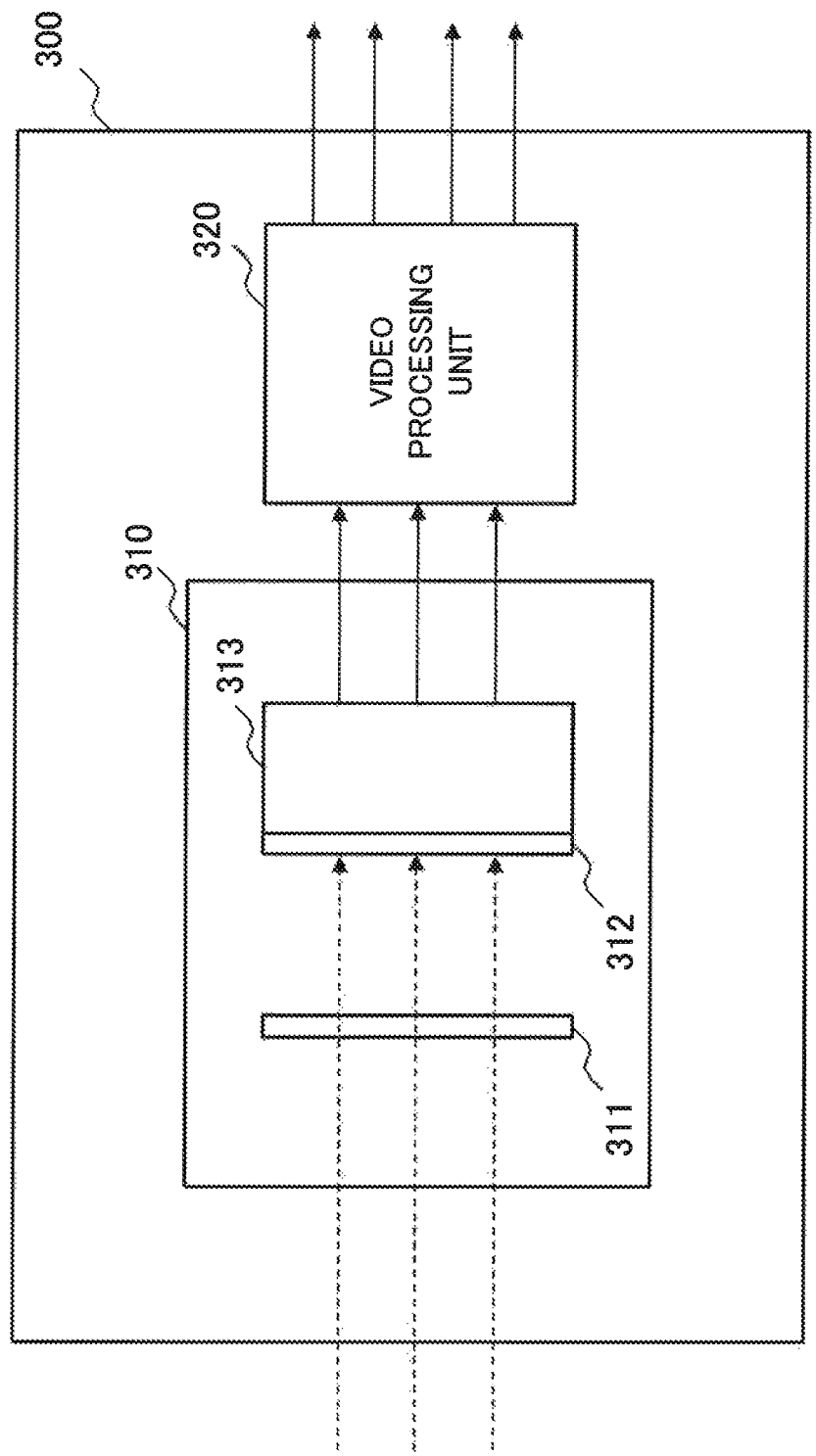
FIG. 10 is a schematic view illustrating a configuration of a capturing device.

FIG. 10 is a schematic diagram illustrating a configuration of a capturing device according to further another example embodiment of the present invention. A capturing device 300 illustrated in FIG. 10 includes a light receiving unit 310 and a video processing unit 320. More specifically, the light receiving unit 310 includes an NIR cut filter 311, a color filter 312, and a photo sensor 313. Light including visible light and near-infrared light is incident on the capturing device 300 through an optical system such as a lens.

The NIR cut filter 311 is an optical filter having a configuration similar to that of the NIR cut filter according to the first and second example embodiments. The NIR cut filter 311 is provided on the front side in a travelling direction of the incident light with respect to the color filter 312 and the photo sensor 313. The NIR cut filter 311 is provided at a prescribed distance from the color filter 312 and the photo sensor 313 so that the near-infrared light diffused by diffraction is received by the photo sensor 313. The NIR cut filter 311 may be detachably or movably configured.

Figure 11:
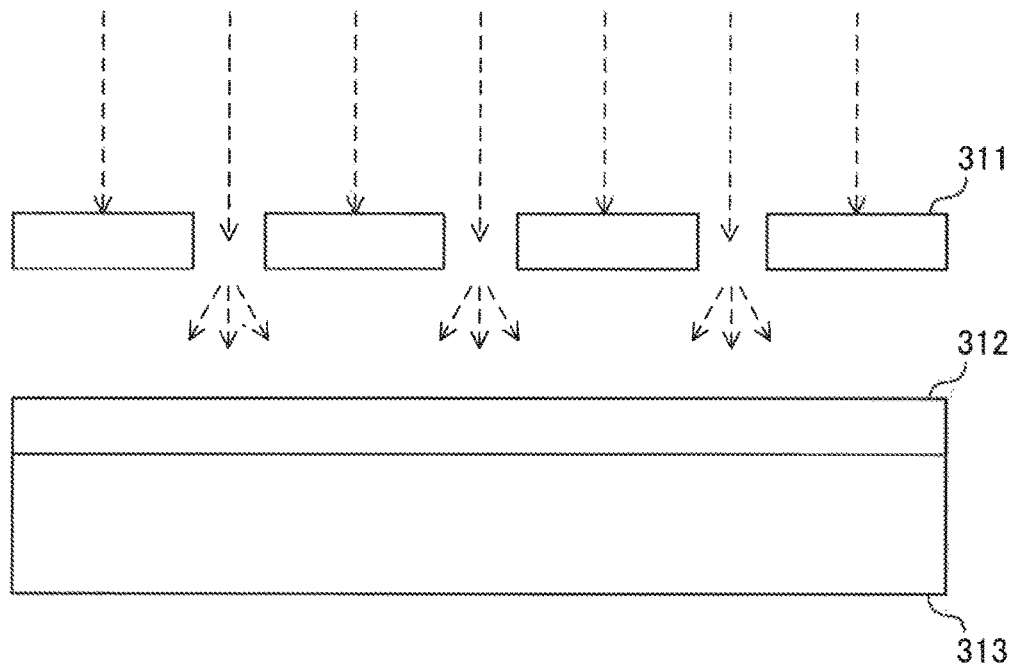
FIG. 11 is a schematic view illustrating a behavior of near-infrared light incident on a light receiving unit.

FIG. 11 is a schematic view representing a behavior of near-infrared light incident on the light receiving unit 310. As illustrated in FIG. 11, the near-infrared light is transmitted through a part (infrared transmissive portion) of the NIR cut filter 311, but is cut in the other portions. However, the near-infrared light is diffracted when passing through the infrared transmissive portion, and thus the near-infrared light is incident in a range wider than the infrared transmissive portion in the photo sensor 313.

Figure 17:
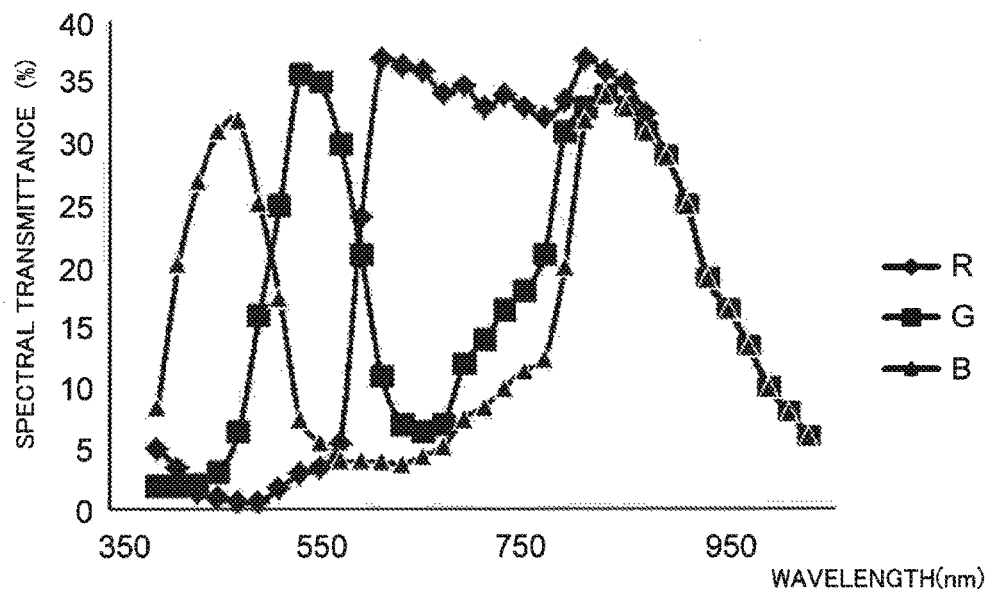
FIG. 17 is a diagram illustrating a spectral transmittance of an RGB 3-color optical filter.
Figure 18:
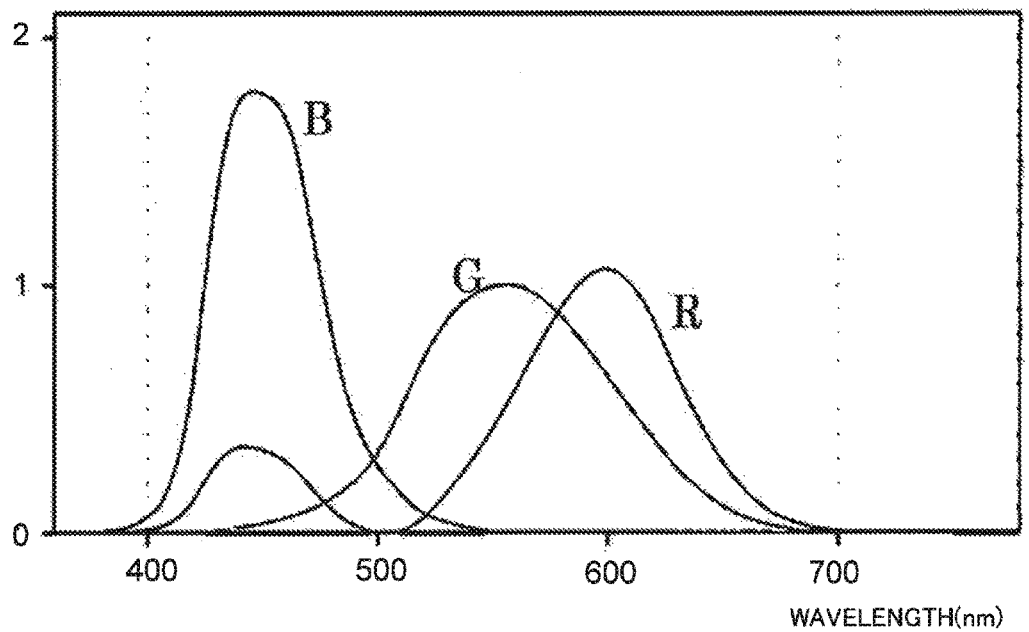
FIG. 18 is a diagram illustrating color-matching functions of an XYZ colorimetric system regarding color perception of a human.
Figure 19:
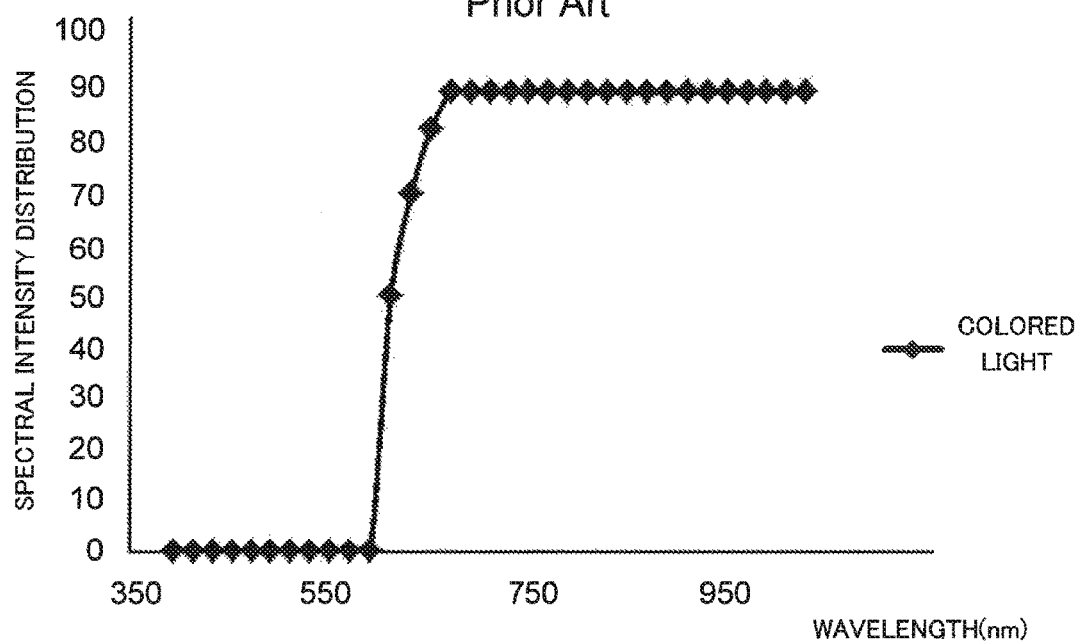
FIG. 19 is a diagram illustrating a spectral intensity distribution of certain colored light.
Figure 20:
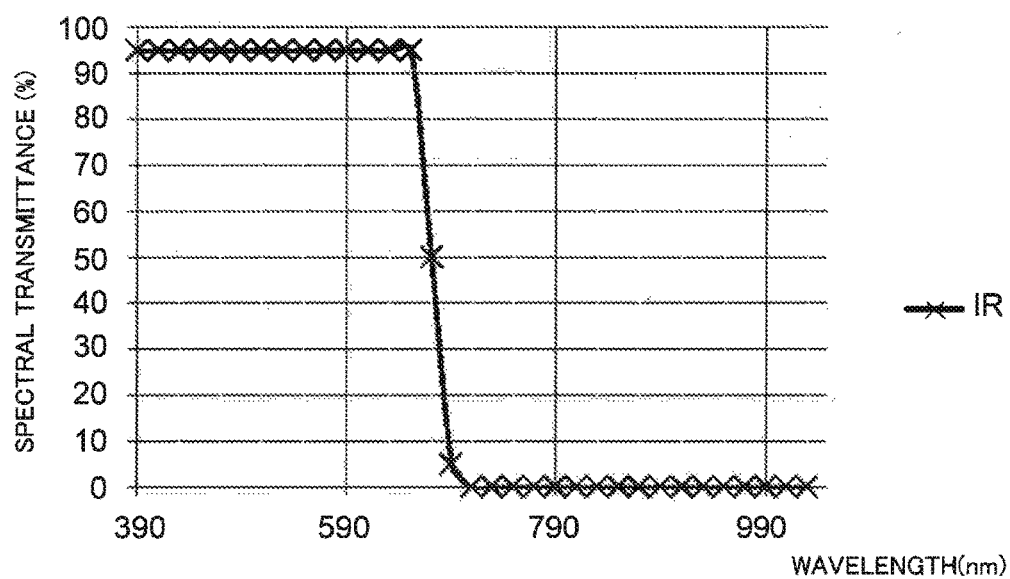
FIG. 20 is a diagram illustrating an example of spectral characteristics of an infrared cut filter.
Figure 21:
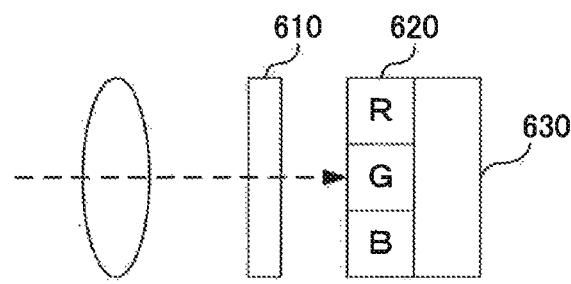
FIG. 21 is a diagram illustrating a configuration example of a color image input device.
Figure 22:
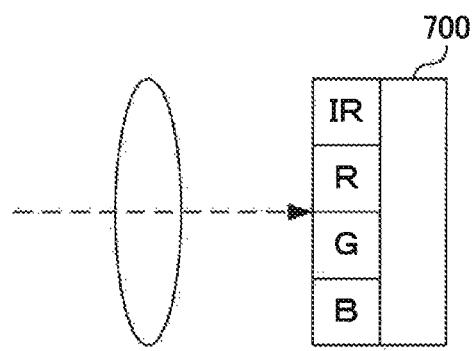
FIG. 22 is a diagram illustrating another configuration example of the color image input device.

The color filter 312 is a three-color optical filter having a typical configuration. The color filter 312 has, for example, spectral characteristics as illustrated in FIG. 17. The photo sensor 313 includes a plurality of photoelectric elements (i.e., sensors) to generate a signal corresponding to the intensity of incident light. The photo sensor 313 may have a configuration similar to that of a typical image input device or capturing device. The video processing unit 320 acquires the signal generated by the photo sensor 313, and executes video processing. The video processing unit 320 has the same functions as those of the video processing device 200 of the second example embodiment, and also has a function for executing demosaicing processing as described below.

Figure 12:
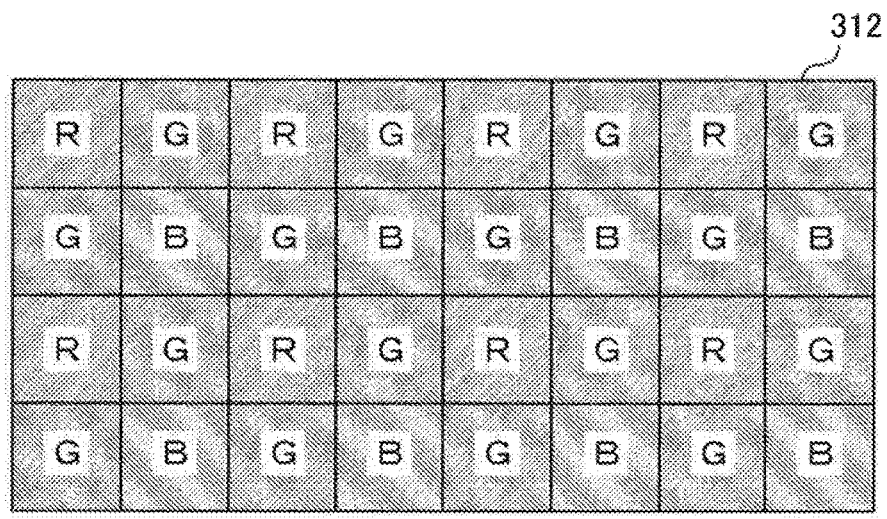
FIG. 12 is a diagram illustrating a configuration of a color filter.

FIG. 12 is a diagram illustrating a part of the configuration of the color filter 312. As illustrated in FIG. 12, the color filter 312 is a so-called Bayer type array. In the color filter 312, filters are provided so as to correspond to the respective sensors (i.e., pixels) of the photo sensor 313.

The pattern of the NIR cut filter 311 may have a correspondence relation with an array of pixels of the photo sensor 313. The term "correspondence relation" described herein indicates that, for example, an interval between infrared transmissive portions of the NIR cut filter 311 is equal to an interval between the pixels of the photo sensor 313, or has an integral multiple relationship. Specifically, the infrared transmissive portions of the NIR cut filter 311 may be provided so as to overlap the pixels corresponding to a specific color in the photo sensor 313. However, the pattern of the NIR cut filter 311 need not necessarily have the correspondence relation with the array of pixels of the photo sensor 313.

The capturing device 300 has a configuration as described above. The capturing device 300 can generate video data represented by four colors (four components) of R, G, B, and NIR based on video data represented by three colors of R, G, and B in this configuration. Major points of operations of the capturing device 300 are the same as those of the video processing device 200 of the second example embodiment. However, the capturing device 300 executes demosaicing processing prior to the operations described in the second example embodiment.

Figure 13:
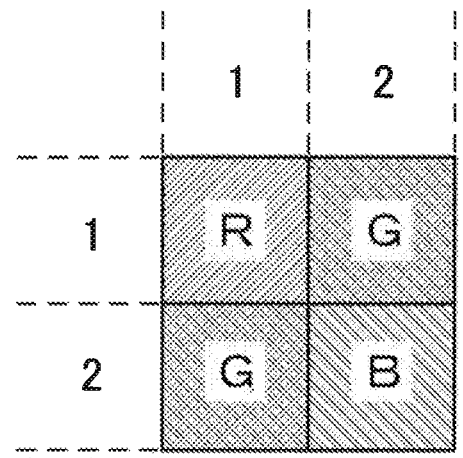
FIG. 13 is a diagram for explaining an example of demosaicing processing.

FIG. 13 is a diagram for explaining an example of demosaicing processing, and illustrates the correspondence relation between pixels and coordinates. In this case, for convenience of explanation, coordinates of (1,1), (1,2), (2,1), and (2,2) are respectively allocated to two rows and two columns of pixels illustrated in FIG. 13. The pixel at the coordinates (1,1) corresponds to an R component. The pixel at the coordinates (2,2) corresponds to a B component. The remaining pixels correspond to G components.

In the following description, pieces of color information (color signal values) each representing RGB colors at coordinates (i,j) are respectively represented by R(i,j), G(i,j), and B(i,j). For example, R(1,1) represents color information about the R component of the pixel at the coordinates (1,1). The color information obtained at the time when demosaicing processing is executed actually includes NIR components. However, it is assumed herein that, for convenience of explanation, the NIR components of the color information are not taken into consideration.

The pixel at the coordinates (1,1) corresponds to the R component. Accordingly, the color information about the R component at the coordinates (1,1) is represented by the following Formula (14).

$$R(1,1)=R(1,1) \quad (14)$$

On the other hand, the pixel at the coordinates (1,1) does not receive other color components. Accordingly, the color information about the G and B components of the pixel at the coordinates (1,1) is obtained by interpolating peripheral pixels as expressed by Formulas (15) and (16).

$$G(1,1)=(G(2,1)+G(1,2))/2 \quad (15)$$

$$B(1,1)=B(2,2) \quad (16)$$

Next, the color information about the pixel at the coordinates (1,2) is expressed by Formulas (17) to (19).

$$G(1,2)=G(1,2) \quad (17)$$

$$R(1,2)=R(1,1) \quad (18)$$

$$B(1,2)=B(2,2) \quad (19)$$

Note that the color information about the pixel at the coordinates (2,1) is obtained in a manner similar to that for the color information about the pixel at the coordinates (1,2). Further, the color information about the pixel at the coordinates (2,2) is obtained in a manner similar to that for the color information about the pixel at the coordinates (1,1).

The video processing unit 320 executes such processing on all pixels to acquire color information for each color. Subsequently, the video processing unit 320 calculates the near-infrared signal by the operations described in the second example embodiment. The demosaicing processing is not limited to the method described above, but instead may be executed by using, for example, methods disclosed in NPLs 4 to 6.

The capturing device 300 can provide advantageous effects similar to those of the video processing device 200 according to the second example embodiment. Further, the capturing device 300 can disperse infrared light by diffraction in the NIR cut filter 311. With this configuration, even when infrared light having an intensity at which the near-infrared signal is saturated is incident on the photo sensor 313, the capturing device 300 can decrease the intensity of the near-infrared signal per pixel and can increase an apparent dynamic range.

The video processing unit 320 may neglect the near-infrared light components included in the color signals of R and B components obtained after the demosaicing processing. Specifically, as for the R and B components, the video processing unit 320 may regard the second term on the right side of Formula (7) as 0 (i.e., $I_{R\_NIR}=I_R$, $I_{B\_NIR}=I_B$). In this case, since $I_{NIR\_R}=I_{NIR\_B}=0$ holds, $I_{NIR}=I_{NIR\_G}$ is established by Formula (13).

Figure 14:
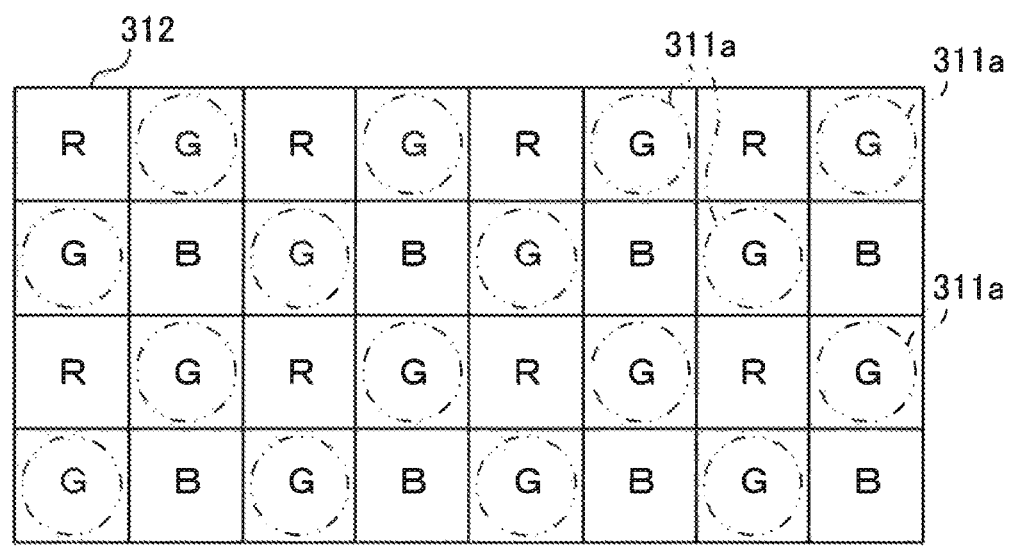
FIG. 14 is a diagram illustrating a correlation relation between an infrared transmissive portion of an NIR cut filter and a color filter.

FIG. 14 is a diagram illustrating a preferred correspondence relation between an infrared transmissive portion 311a of the NIR cut filter 311 and the color filter 312. FIG. 14 illustrates a positional relationship between the NIR cut filter 311 and the color filter 312 as viewed along the light incident direction. All of the infrared transmissive portions 311a illustrated in FIG. 14 are located at a position where the infrared transmissive portion 311a overlaps the pixel corresponding to the G component. When the NIR cut filter 311 has such a pattern, the effect of an error caused when $I_{NIR\_R}$ and $I_{NIR\_B}$ are neglected can be reduced as compared with a case where the NIR cut filter 311 does not have such a pattern (e.g., when the infrared transmissive portion 311a overlaps the pixel corresponding to the R component or the B component).

MODIFIED EXAMPLES

Example embodiments of the present invention are not limited to the first to third example embodiments described above. For example, the present invention can also be implemented by aspects of modified examples described below. The present invention may also be implemented by aspects in which the first to third example embodiments and the modified examples are combined as appropriate.

(1) Modified Example 1

In the example embodiments of the present invention, the specific shape of the pattern of the NIR cut filter is not limited, as long as the pattern can be described as pattern information. For example, in the pattern formed in the NIR cut filter, the shape of each infrared transmissive portion is not limited to a circular shape, and all the infrared transmissive portions need not necessarily have the same shape.

(2) Modified Example 2

In the example embodiments of the present invention, the visible light components are not limited to three components of R, G, and B. As the visible light components, for example, three components of cyan (C), magenta (M), and yellow (Y) may be used. Further, the visible light components are not necessarily composed of three components, but instead may be composed of components less or more than three components.

(3) Modified Example 3

Figure 15:
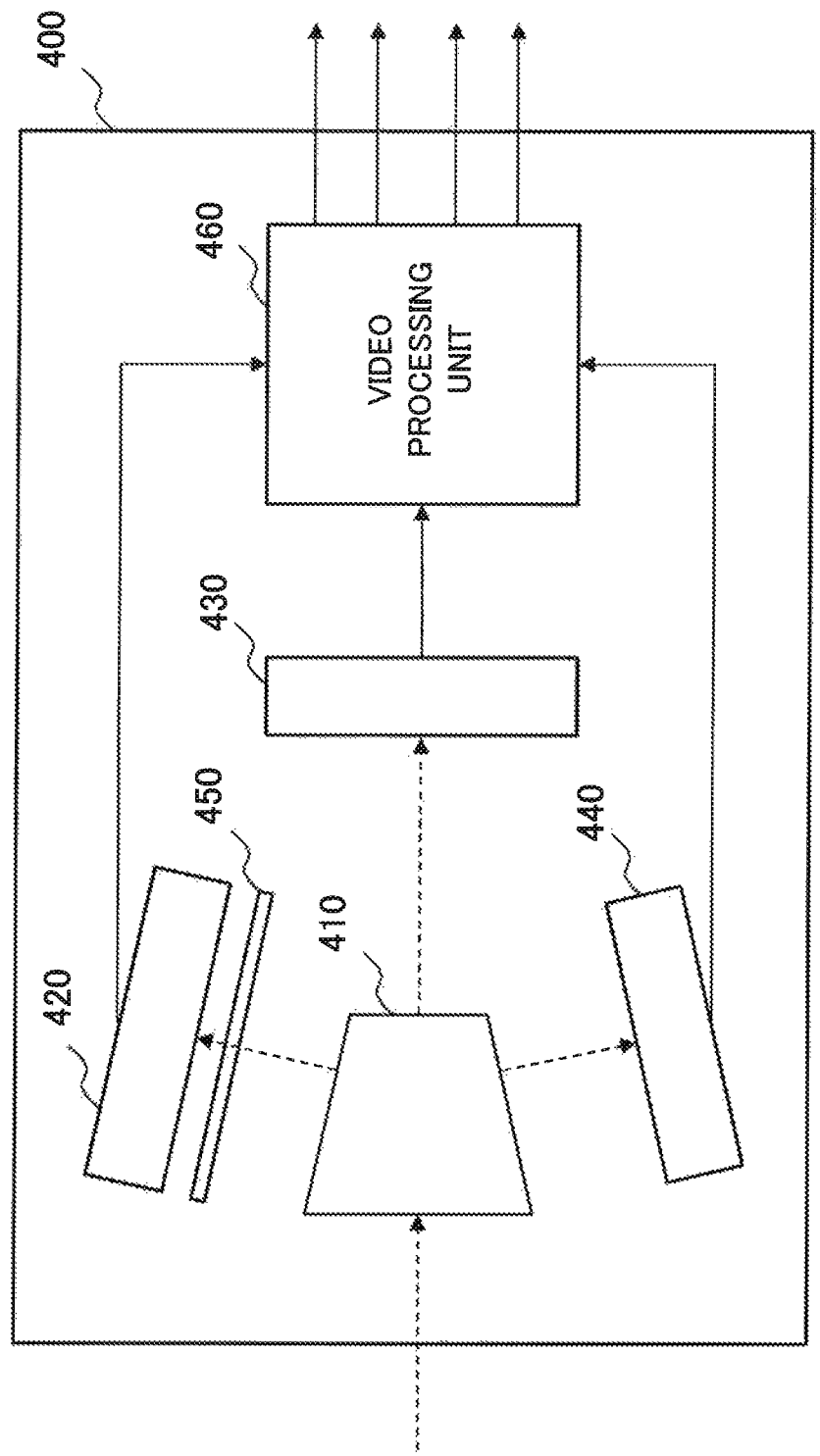
FIG. 15 is a schematic view illustrating a configuration of a capturing device.
Figure 16:
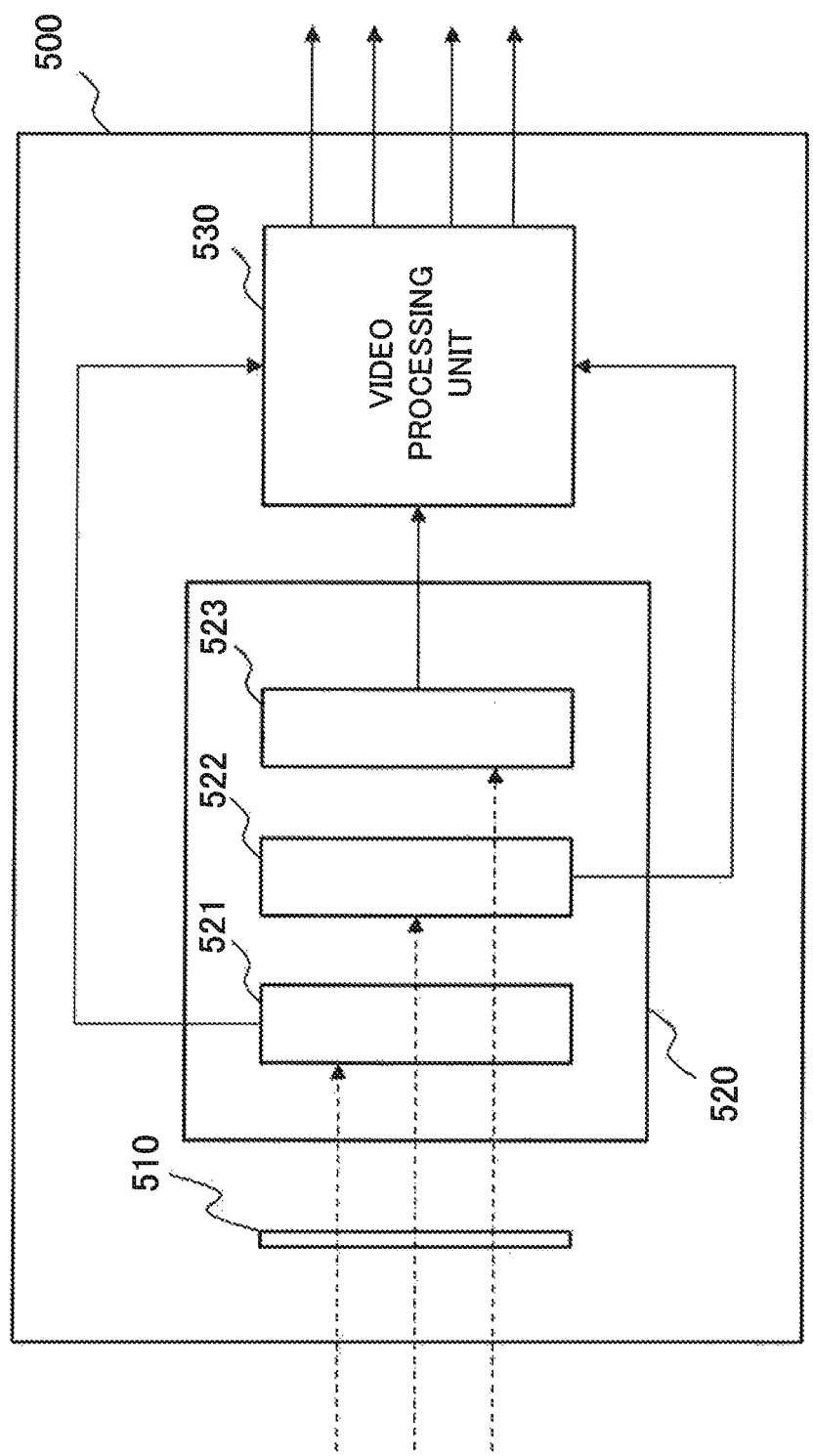
FIG. 16 is a schematic view illustrating another configuration of the capturing device.

FIGS. 15 and 16 are diagrams each illustrating another example of the capturing device. FIG. 15 is a diagram illustrating a capturing device 400 having a so-called three-plate type configuration, i.e., a configuration in which sensors respectively corresponding to R, G, and B colors are provided separately. FIG. 16 is a diagram illustrating a capturing device 500 including a so-called stacked sensor. The present invention can also be applied to a capturing device having such a configuration.

The capturing device 400 includes a prism 410, photo sensors 420, 430, and 440, an NIR cut filter 450, and a video processing unit 460. The prism 410 decomposes incident light and outputs the decomposed light in directions corresponding to the R, G, and B components, respectively. The photo sensors 420(R), 430(G), and 440(B) each generate a signal corresponding to the intensity of incident light of each color.

The NIR cut filter 450 is an optical filter similar to the NIR cut filter 311 of the third example embodiment. There is no need to provide the NIR cut filter 450 in all the photo sensors 420, 430, and 440. The NIR cut filter 450 may be provided in any one of the photosensors (photosensor 420 in FIG. 15) depending on the spectral characteristics of the prism 410. In the case of the example illustrated in FIG. 15, it is assumed that the near-infrared light incident on the photo sensors 430 and 440 is sufficiently less than the near-infrared light incident on the photo sensor 420. For example, an optical filter for cutting near-infrared light (however, unlike the NIR cut filter 450, the optical filter has no pattern for transmitting near-infrared light formed) may be provided at a pre-stage of each of the photo sensors 430 and 440.

The video processing unit 460 may have a configuration similar to that of the video processing unit 320 described in the third example embodiment. However, in the example illustrated in FIG. 15, only the color signal corresponding to the R component includes near-infrared light components. Accordingly, the video processing unit 460 may execute processing for separating the near-infrared signal from the color signal only on the color signal corresponding to the R component.

The capturing device 500 includes an NIR cut filter 510, a stacked sensor 520, and a video processing unit 530. The NIR cut filter 510 and the video processing unit 530 may have configurations similar to those of the NIR cut filter 450 and the video processing unit 460, respectively, illustrated in FIG. 15.

The stacked sensor 520 is a sensor in which sensors 521, 522, and 523 are stacked. The sensor 521 has sensitivity in the wavelength range of the B component. The sensor 522 has sensitivity in the wavelength range of the G component. The sensor 523 has sensitivity in the wavelength ranges of the R component and the near-infrared light components.

(4) Modified Example 4

The whole or a part of the configuration according to the present invention can be implemented by a computer. For example, the video processing devices 100 and 200 and the video processing unit 320 can be implemented by a processing device (processor), such as a central processing unit (CPU), and a memory. The present invention may also be implemented by a general-purpose processor or a processor dedicated to video processing.

The present invention may also be provided in the form of a program that can be executed by a computer. This program may be provided in the form in which the program is downloaded from another device (a server or the like) via a network, or may be provided in the form of a computer-readable storage medium. Furthermore, the present invention can be provided not only as a video processing device, a capturing device, a program, and a storage medium, but also as a video processing method.

The present invention has been described above by citing the example embodiments described above as exemplary embodiments. However, the present invention is not limited to the example embodiments described above. In other words, the present invention can be applied in various forms that can be understood by those skilled in the art within the scope of the present invention.

This application is based upon and claims the benefit of priority from Japanese patent application No. 2015-184885, filed on Sep. 18, 2015, the disclosure of which is incorporated herein in its entirety by reference.

REFERENCE SIGNS LIST

10, 311 NIR cut filter
12, 311a Infrared transmissive portion
100, 200 Video processing device
110 Acquisition unit
120 Signal processing unit
210 Video data acquisition unit
220 First color signal acquisition unit
230 Pattern storage unit
240 Second color signal estimation unit
241 Initial value estimation unit
242 Estimated value selection unit
243 Smoothness evaluation unit
244 First color signal estimation unit
245 Error calculation unit
246 Estimated value update unit
250 Near-infrared signal calculation unit
260 Output unit
300, 400, 500 Capturing device
310 Light receiving unit
312 Color filter
313 Photo sensor
320 Video processing unit

What is claimed is:

1. An image processing device comprising:
an acquirer implemented at least by hardware configured to acquire a video signal representing a video including near-infrared light having an intensity corresponding to a pattern having a prescribed geometric shape; and
a signal processer implemented at least by the hardware configured to output a color signal and a near-infrared signal by using pattern information for defining the pattern, the color signal representing a visible light component corresponding to the acquired video signal, the near-infrared signal representing a near-infrared light component corresponding to the video signal, wherein
when a difference between the acquired video signal and an estimated value of the video signal calculated by using an estimated value of the color signal, an estimated value of an intensity ratio between the color signal and the near-infrared signal, and the pattern information satisfies a first condition, and a spatial variation in an estimated value of the color signal and an estimated value of the intensity ratio satisfies a second condition, the signal processer outputs, as an output signal, an estimated value of the color signal and a value of the near-infrared signal obtained from an estimated value of the color signal and an estimated value of the intensity ratio.

2. The image processing device according to claim 1, wherein
the pattern information indicates a position and a shape of the pattern.

3. The image processing device according to claim 1, further comprising
a light receiver implemented at least by the hardware and including an optical filter including a transmission configured to transmit near-infrared light with the pattern.

4. The image processing device according to claim 3, wherein
the light receiver includes a plurality of sensors each corresponding to one of a plurality of color components, and
the pattern has a correspondence relation with an array of the plurality of sensors.

5. An image processing method comprising:
acquiring a video signal representing a video including near-infrared light having an intensity corresponding to a pattern having a prescribed geometric shape;
outputting, by using pattern information for defining the pattern, a color signal representing a visible light component corresponding to the acquired video signal and a near-infrared signal representing a near-infrared light component corresponding to the video signal, and
outputting, as an output signal, an estimated value of the color signal and a value of the near-infrared signal obtained from an estimated value of the color signal and an estimated value of the intensity ratio, when a difference between the acquired video signal and an estimated value of the video signal calculated by using an estimated value of the color signal, an estimated value of an intensity ratio between the color signal and the near-infrared signal, and the pattern information satisfies a first condition, and a spatial variation in an estimated value of the color signal and an estimated value of the intensity ratio satisfies a second condition.

6. A non-transitory computer-readable medium program recording medium recording a program causing a computer to execute:
processing of acquiring a video signal representing a video including a near-infrared light having an intensity corresponding to a pattern having a prescribed geometric shape; and processing of outputting, by using pattern information for defining the pattern, a color signal representing a visible light component corresponding to the acquired video signal and a near-infrared signal representing a near-infrared light component corresponding to the video signal, and processing of outputting, as an output signal, an estimated value of the color signal and a value of the near-infrared signal obtained from an estimated value of the color signal and an estimated value of the intensity ratio, when a difference between the acquired video signal and an estimated value of the video signal calculated by using an estimated value of the color signal, an estimated value of an intensity ratio between the color signal and the near-infrared signal, and the pattern information satisfies a first condition, and a spatial variation in an estimated value of the color signal and an estimated value of the intensity ratio satisfies a second condition.

* * * * *